United States Patent
Ghazisaeidi et al.

(10) Patent No.: US 12,335,377 B2
(45) Date of Patent: Jun. 17, 2025

(54) CONTINUOUS VARIABLE QUANTUM KEY DISTRIBUTION

(71) Applicant: Nokia Technologies Oy, Espoo (FI)

(72) Inventors: Amirhossein Ghazisaeidi, L'Haÿ-les-Roses (FR); Francois Roumestan, Antony (FR)

(73) Assignee: Nokia Technologies Oy, Espoo (FI)

( * ) Notice: Subject to any disclaimer, the term of this patent is extended or adjusted under 35 U.S.C. 154(b) by 643 days.

(21) Appl. No.: 17/529,451

(22) Filed: Nov. 18, 2021

(65) Prior Publication Data
US 2022/0166612 A1 May 26, 2022

(30) Foreign Application Priority Data
Nov. 20, 2020 (EP) .................................. 20306420

(51) Int. Cl.
- *H04L 9/40* (2022.01)
- *G06F 17/16* (2006.01)
- *G06F 17/17* (2006.01)
- *H04L 9/08* (2006.01)

(52) U.S. Cl.
CPC ............ *H04L 9/0855* (2013.01); *G06F 17/16* (2013.01); *G06F 17/17* (2013.01); *H04L 9/0825* (2013.01); *H04L 9/0858* (2013.01)

(58) Field of Classification Search
CPC ......... H04L 9/0858; G06F 17/16; G06F 17/17
See application file for complete search history.

(56) References Cited

U.S. PATENT DOCUMENTS

| | | | |
|---|---|---|---|
| 2015/0030331 A1* | 1/2015 | Salsi | ................. H04B 10/6163 398/65 |
| 2015/0134947 A1 | 5/2015 | Varcoe et al. | |
| 2016/0204894 A1 | 7/2016 | Dong et al. | |

(Continued)

FOREIGN PATENT DOCUMENTS

WO     2016/099565 A1    6/2016

OTHER PUBLICATIONS

Milovančev et al., "Spectrally-Shaped Continuous-Variable QKD Operating at 500 MHz Over an Optical Pipe Lit by 11 DWDM Channels", Optical Fiber Communication Conference (OFC), 2020, 3 pages.

(Continued)

Primary Examiner — Thaddeus J Plecha
(74) Attorney, Agent, or Firm — McCarter & English, LLP

(57) ABSTRACT

An apparatus for random key transmission comprising a laser (101) configured to generate a coherent source optical signal; a quantum random number generator, QRNG, (105) configured to generate random bits ($R_i$); an electro-optical modulator (107) configured to modulate the coherent source optical signal to generate a modulated optical signal including Quadrature Phase Shift Keying, QPSK, pilot symbols temporally multiplexed with quantum key distribution, QKD, symbols representing the random bits, wherein quadratures values of the modulated optical signal follow a modulation map, wherein the modulation map is a quadrature amplitude modulation, QAM, based Probabilistic Constellation Shaping, PCS, modulation map defining a mapping function for the random bits.

16 Claims, 9 Drawing Sheets

(56) References Cited

U.S. PATENT DOCUMENTS

| | | | |
|---|---|---|---|
| 2017/0322664 A1* | 11/2017 | Park | G06F 3/03547 |
| 2020/0213105 A1 | 7/2020 | Li et al. | |
| 2020/0389299 A1* | 12/2020 | White | H04B 10/85 |
| 2024/0056195 A1* | 2/2024 | Arikawa | H04B 10/6165 |

OTHER PUBLICATIONS

Eriksson et al., "Digital Self-Coherent Continuous Variable Quantum Key Distribution System", Optical Fiber Communications Conference and Exhibition (OFC), Mar. 8-12, 2020, 3 pages.

Ghazisaeidi et al., "Advanced C+L-Band Transoceanic Transmission Systems Based on Probabilistically Shaped PDM-64QAM", Journal of Lightwave Technology, vol. 35, No. 7, Apr. 1, 2017, pp. 1291-1299.

Djordjevic, "Optimized-eight-state CV-QKD Protocol Outperforming Gaussian Modulation Based Protocols", IEEE Photonics Journal, vol. 11, No. 4, Aug. 2019, 11 pages.

Laudenbach et al., "Pilot-assisted Intradyne Reception for Highspeed Continuous-variable Quantum Key Distribution with True Local Oscillator", arXiv, Oct. 3, 2019, pp. 1-12.

Vidarte, "Design and Implementation of Highperformance Devices for Continuous-variable Quantum Key Distribution", Thesis, 2020, 225 pages.

Grosshans et al., "Continuous Variable Quantum Cryptography Using Coherent States", Physical Review Letters, vol. 88, No. 5, Feb. 4, 2002, pp. 057902-1-057902-4.

Bocherer et al., "Probabilistic Shaping and Forward Error Correction for Fiber-Optic Communication Systems", Journal of Lightwave Technology, vol. 37, No. 2, Jan. 15, 2019, pp. 230-244.

Gordon et al., "PMD fundamentals: Polarization mode dispersion in optical fibers", Proceedings of the National Academy of Sciences of the United States of America, vol. 97, No. 9, Apr. 25, 2000, pp. 4541-4550.

Kikuchi et al., "Fundamentals of Coherent Optical Fiber Communications", Journal of Lightwave Technology, vol. 34, No. 1, Jan. 1, 2016, pp. 157-179.

Leverrier et al., "Continuous-variable quantum-key-distribution protocols with a non-Gaussian modulation", Physical Review, vol. 83, 2011, pp. 042312-1-042312-15.

Laudenbach et al., "Continuous-Variable Quantum Key Distribution with Gaussian Modulation—The Theory of Practical Implementations", Advanced Quantum Technologies, arXiv, May 10, 2018, pp. 1-71.

Extended European Search Report received for corresponding European Patent Application No. 20306420.9, dated May 14, 2021, 8 pages.

Magarini et al., "Pilot-Symbols-Aided Carrier-Phase Recovery for 100-G PM-QPSK Digital Coherent Receivers", IEEE Photonics Technology Letters, vol. 24, No. 9, May 1, 2012, pp. 739-741.

Notice of Allowance received for corresponding European Patent Application No. 20306420.9, dated May 14, 2024, 8 pages.

* cited by examiner

CONTINUOUS VARIABLE QUANTUM KEY DISTRIBUTION

TECHNICAL FIELD

Various example embodiments relate generally to method and apparatuses for continuous variable quantum key distribution (CV-QKD).

BACKGROUND

Quantum Key Distribution (or QKD) is a secure communication method taking advantage of Heisenberg uncertainty principle. The general framework is the following: Alice (sender side) and Bob (receiver side) are willing to produce a shared random key that will serve to generate a secret key in a cryptographic protocol such as the one-time pad. In order to do so they will communicate random data on an unsecure quantum channel such as an optical fibre.

If a third party, call her Eve, wants to eavesdrop on the quantum signal then Eve must perform a measurement that will disrupt the channel. Alice and Bob can evaluate this disturbance and estimate the quantity of information obtained by Eve, e.g. by detecting on receiver side an increase of the variance of the noise. Finally, Alice and Bob can extract or generate a secret key from at least a portion of the shared random key left untouched by Eve: the secret key may therefore be shorter than the shared random key transmitted by Alice. This extraction process may be monitored by communicating on a second classical channel. This classical monitoring channel is assumed to be an authenticated channel. The article by F. Grosshans and P. Grangier, entitled 'Continuous Variable Quantum Cryptography Using Coherent States', Phys. Rev. Lett., vol. 88, no. 5, p. 057902, January 2002, doi: 10.1103/PhysRevLett.88.057902, discloses details of an efficient CV-QKD protocol (referred to as the GG02 protocol) and how to implement the estimation.

As of today, there exists two approaches to implement QKD protocols. On the one hand, Discrete Variable QKD (or DVQKD) which enables the best performance at longer distances. However, its implementation is complex and requires expensive hardware components based on single-photon devices, ambient low temperature for the receiver, and careful control of the hardware. On the other hand, Continuous Variable QKD (or CVQKD) is closer to the classical communication systems and can be implemented using off-the-shelf telecom equipment operating at realistic field conditions.

According to CV-QKD security proofs, the best performance is achieved when encoding the random data on a Gaussian modulation. Unfortunately, perfect Gaussian modulation includes infinite constellation points and is not implementable in digital hardware. Most of state-of-art experimental systems uses Gaussian modulations but without solution for the coding problems. That is why state-of-the-art CV-QKD systems are working with discrete modulations such as QPSK. However it is a problem because the existing security proofs for discrete modulations such as QPSK are weaker and exhibit much shorter keys than Gaussian modulations. Moreover, the functioning regime is much noisier with discrete modulations such as QPSK. Hence it is more difficult to implement efficient digital signal processing (DSP) on receiver side to recover the transmitted signal.

SUMMARY

The scope of protection is set out by the independent claims. The embodiments, examples and features, if any, described in this specification that do not fall under the scope of the protection are to be interpreted as examples useful for understanding the various embodiments or examples that fall under the scope of protection.

According to a first aspect, an apparatus for random key transmission is provided. The apparatus comprises:
   a laser configured to generate a coherent source optical signal;
   a quantum random number generator, QRNG, configured to generate random bits ($R_i$) of at least one random key;
   an electro-optical modulator configured to modulate the coherent source optical signal to generate a modulated optical signal including Quadrature Phase Shift Keying, QPSK, pilot symbols temporally multiplexed with quantum key distribution, QKD, symbols representing the random bits,
wherein quadratures values of the modulated optical signal follow a modulation map, wherein the modulation map is a quadrature amplitude modulation, QAM, based Probabilistic Constellation Shaping, PCS, modulation map defining a mapping function for the random bits.

In one or more examples, the apparatus further comprises a power attenuator configured to adjust the variance of the power of the modulated optical signal.

According to a second aspect, an apparatus for random key decoding is provided. The apparatus comprises at least one digital signal processing circuitry configured to
   obtain input symbols, wherein the input symbols include Quadrature Phase Shift Keying, QPSK, pilot symbols temporally multiplexed with quantum key distribution, QKD, symbols representing random bits of at least one random key, wherein quadratures values of the modulated optical signal follow a modulation map, wherein the modulation map is a quadrature amplitude modulation, QAM, based Probabilistic Constellation Shaping, PCS, modulation map defining a mapping function for the random bits;
   apply a polarization correction to the input symbols to generate first corrected QKD symbols and corrected pilot symbols, wherein the polarization correction is determined based at least on the pilot symbols;
   apply a carrier phase correction to the first corrected QKD symbols to generate second corrected QKD symbols representing an estimate of said at least one random key, wherein the carrier phase correction is determined based on the corrected pilot symbols.

In one or more examples, applying the polarization correction includes determining a rotation matrix in a Stokes space representing a polarization impairment, determining an inverse matrix of a Jones matrix corresponding to the rotation matrix and applying in a Jones space the inverse matrix to vectors representing the input symbols.

In one or more examples, determining the rotation matrix includes:
   converting the input symbols into corresponding vectors in the Stokes space;
   performing a linear regression on the vectors to obtain a regression vector,
   determining the rotation matrix in the Stokes space from the regression vector;

In one or more examples, determining the inverse matrix includes:
   converting the rotation matrix in the Stokes space to a Jones matrix in the Jones space;
   inversing the Jones matrix in the Jones space to obtain the inverse matrix.

In one or more examples, applying the carrier phase correction includes applying a Kalman filter to the corrected pilot symbols obtained from corresponding pilot symbols to estimate phase noise values for the corresponding pilot symbols and estimating a phase noise value for a QKD symbol by applying a linear interpolation to phase noise values estimated for at least a first pilot symbol and at least one second pilot symbol between which the QKD symbol is temporally interleaved.

In one or more examples, the apparatus further comprises a laser coupled to a coherent receiver circuit for receiving and extracting the symbols from a modulated optical signal.

According to another aspect, a method for random key decoding is provided. The method comprises:

obtaining input symbols, wherein the input symbols include Quadrature Phase Shift Keying, QPSK, pilot symbols temporally multiplexed with quantum key distribution, QKD, symbols representing random bits of at least one random key, wherein quadratures values of the modulated optical signal follow a modulation map, wherein the modulation map is a quadrature amplitude modulation, QAM, based Probabilistic Constellation Shaping, PCS, modulation map defining a mapping function for the random bits;

applying a polarization correction to the input symbols to generate first corrected QKD symbols and corrected pilot symbols, wherein the polarization correction is determined based at least on the pilot symbols;

applying a carrier phase correction to the first corrected QKD symbols to generate second corrected QKD symbols representing an estimate of said at least one random key, wherein the carrier phase correction is determined on the basis of the corrected pilot symbols.

Applying the polarization correction may include determining a rotation matrix in a Stokes space representing a polarization impairment based at least on the pilot symbols, determining an inverse matrix of a Jones matrix corresponding to the rotation matrix and applying in a Jones space the inverse matrix to vectors representing the QKD symbols.

Determining the rotation matrix may include:
converting input symbols into corresponding vectors in the Stokes space;
performing a linear regression on the vectors to obtain a regression vector (s);
determining a rotation matrix in the Stokes space from the regression vector (s);
Determining the inverse matrix may include:
converting the rotation matrix to a Jones matrix in the Jones space;
inversing the Jones matrix in the Jones space to obtain the inverse matrix.

Applying the carrier phase correction may include applying a Kalman filter to the corrected pilot symbols obtained from corresponding pilot symbols to estimate respective phase noise values for the corresponding pilot symbols and estimating a phase noise value for a QKD symbol by applying a linear interpolation to phase noise values estimated for at least a first pilot symbol and at least one second pilot symbol between which the QKD symbol is temporally interleaved.

According to another aspect, an apparatus comprising at least one processor and at least one memory including computer program code is provided. The at least one memory and the computer program code are configured to, with the at least one processor, cause the apparatus to perform one or more or all steps of a method for random key decoding as disclosed therein.

Generally, the apparatus comprises means for performing one or more or all steps of a method for random key decoding as disclosed herein. The means may include circuitry configured to perform one or more or all steps of the method for random key decoding as disclosed herein. The means may include at least one processor and at least one memory including computer program code, wherein the at least one memory and the computer program code are configured to, with the at least one processor, cause the apparatus to perform one or more or all steps of the method for random key decoding as disclosed herein.

At least one example embodiment provides a non-transitory computer-readable medium storing computer-executable instructions that, when executed by at least one processor at an apparatus, causes the apparatus to perform a method for random key decoding as disclosed therein.

Generally, the computer-executable instructions cause the apparatus to perform one or more or all steps of a method for random key decoding as disclosed herein.

BRIEF DESCRIPTION OF THE DRAWINGS

Example embodiments will become more fully understood from the detailed description given herein below and the accompanying drawings, which are given by way of illustration only and thus are not limiting of this disclosure.

Figure 1A:
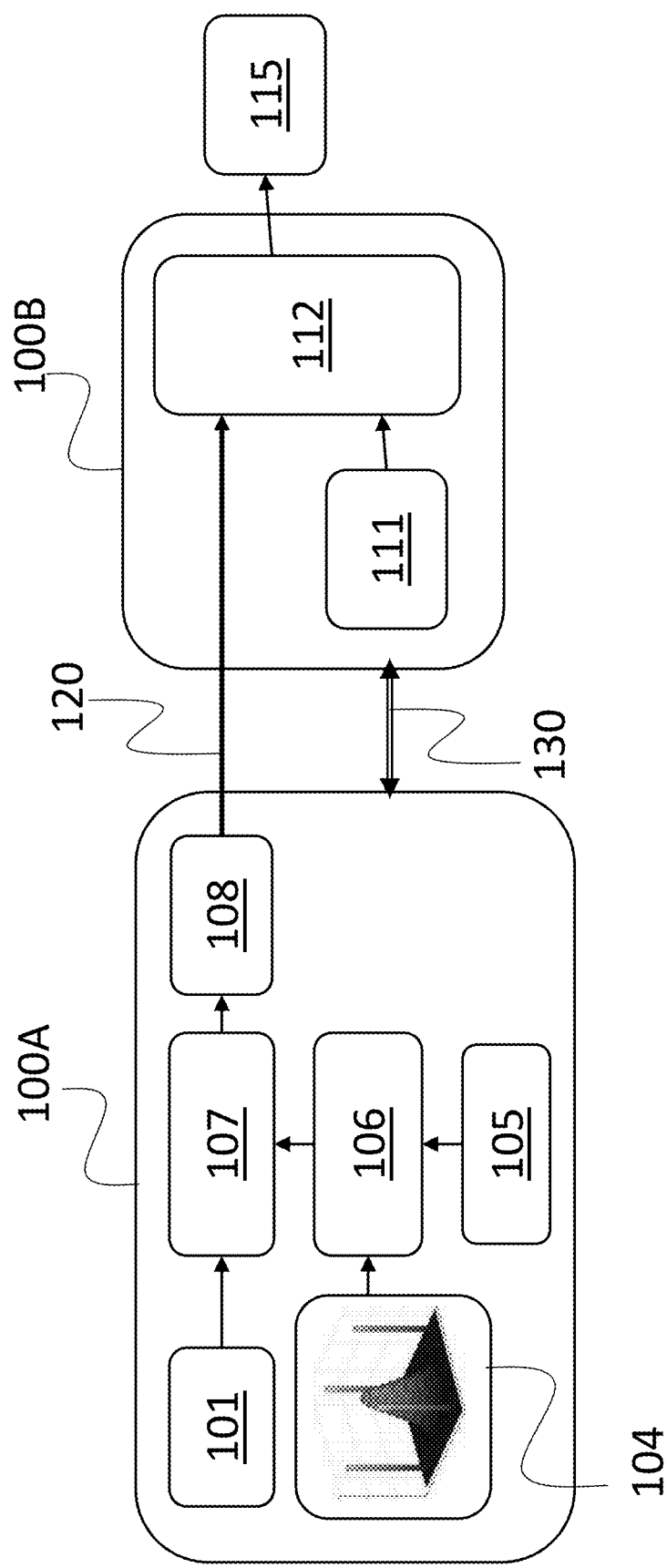
FIG. 1A shows a schematic representation of a QKD system according to one or more examples.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed example embodiments are disclosed herein. However, specific structural and functional details disclosed herein are merely representative for purposes of describing example embodiments. The example embodiments may, however, be embodied in many alternate forms and should not be construed as limited to only the embodiments set forth herein. Accordingly, while example embodiments are capable of various modifications and alternative forms, the embodiments are shown by way of example in the drawings and will be described herein in detail. It should be understood, however, that there is no intent to limit example embodiments to the particular forms disclosed.

In the QKD system disclosed herein, a coherent transceiver apparatus using a QAM-based PCS modulation is used in conjunction with corresponding DSP suite for implementing CV-QKD. In this framework the random data to be shared between Alice and Bob is encoded in the quadratures (I and Q values) of the electric field of light pulses produced by a laser. The I and Q quadratures are the Cartesian (orthogonal) components of the quantized electric field: to a couple of values representing the amplitude and phase correspond a couple of values of the orthogonal components. Alice modulates randomly the amplitude and phase of the signal produced by the laser, with a given distribution defined by a QAM-based PCS constellation map.

Probabilistic constellation shaping (PCS) is a technology that provides fine rate adaptability together with high sensitivity approaching the Shannon limit. QAM-based PCS uses a base modulation format which is a quadrature amplitude modulation (QAM) format, for example a square QAM such as 16QAM and 64QAM and changes the probability of the occurrence of constellation points. By adjusting the variance of the probability distribution, PCS enables fine rate adaptation and generation of a signal close to the optimum Gaussian distribution for a linear channel. The probability distribution is here the Maxwell-Boltzmann function.

The PCS probability distribution may be realized by an algorithm implemented by a computer or circuitry, called here distribution matcher, which receives as input long blocks of binary random information bits, and uses source coding techniques, such that the frequency of occurrence of symbols in the corresponding output block correspond to the probability given by the target probability distribution, which is here the Maxwell-Boltzmann function. See for example the document by Georg Böcherer et al, entitled "Probabilistic Shaping and Forward Error Correction for Fiber-Optic Communication Systems", Journal of Lightwave Technology, Vol. 37, Issue 2, pp. 230-244, (2019).

Eve cannot intercept the signal without introducing transmission noise. In the QKD system disclosed herein, the quadrature values act like the position and momentum of a particle (e.g. photon) that, according to the Heisenberg principle, cannot be simultaneously and precisely determined by Eve. The uncertainty principle applies hence to any measurement performed by Eve on any of the two quadratures and guarantees that an increase in the variance observed by Bob is produced. Alice and Bob can track this increase of variance back to the quality of Eve's measurement. To convert this increase of variance in an amount of information (measured in bits), the information theory developed by Shannon during the war may be used. The Shannon theory makes the link between this variance and the quantity of information obtained by Eve. The GG02 protocol defined by Grosshans and Grangier cited in introduction, using ordinary lasers and homodyne detections, may be used with this respect.

In the QKD system disclosed herein, the apparatus at sender side is a CVQKD setup based on a Gaussian-like version of a QAM modulation, here QAM-based PCS used to send the shared random data (also referred to herein as the QKD signal). This type of modulation enables approaching the Shannon capacity. Compared to other approaches based on QPSK modulation (see for example D. Milovančev et al., "Spectrally-Shaped Continuous-Variable QKD Operating at 500 MHz Over an Optical Pipe Lit by 11 DWDM Channels", in Optical Fiber Communication Conference 2020, paper T3D.4, March. 2020), the QAM-based PCS modulation allows to use the strongest and most efficient Gaussian security proofs and also the use of coding techniques developed for classical (i.e. non quantum) communication. A high cardinality of the QAM constellation is used with a distribution shaped like a Gaussian distribution, for example a PCS 1024 QAM. The cardinality may be for example 512, 1024, 2048 or 4096 or higher.

In the QKD system disclosed herein, the QKD signal is interleaved (multiplexed) in time with QPSK pilot symbols to allow random key decoding at receiver side. Compared to the use of pilot-tones used in approaches based on QPSK modulation, the use of QPSK pilot symbols offers two advantages: it is more efficient relatively to bandwidth occupation and offers a simpler implementation hence cheaper equipment. The temporal interleaving scheme may be implemented in various manner as will be described in details below.

FIG. 1A shows a block diagram of apparatuses (100A, 100B) of a CVQKD system according to one or more embodiments. On sender side (Alice), the apparatus (100A) is also referred to as the sender 100A. At receiver side, the apparatus (100B) is also referred to as the receiver 100B.

The sender (100A) includes a Quantum Random Number Generator (QRNG) (105) configured to generate random bits ($R_i$). A QRNG is for example be implemented by a dedicated physical circuit that generate a sequence of random numbers from an initial value and rely on a mathematical model that guarantees the random character of the sequence.

The apparatus (100A) also include a laser (101) configured to generate a coherent source optical signal (e.g. light pulses) having a linear polarization and only a horizontal polarization. The laser (101) is for example an industrial laser. The lasers (101) may be a continuous wave tunable external cavity semiconductor laser.

The apparatus (100A) includes in a memory (104) storing a PCS N QAM constellation map, where N represent the cardinality of the constellation map. For example, N=1024. The PCS 1024 QAM modulation is a discretized version of the Gaussian modulation. The high cardinality N of this modulation makes it possible to use a Gaussian approximation for the security analysis and proof. In other word it is possible to use the SKR formulas of Gaussian modulation CVQKD, hence enabling much better performance than QPSK formulas.

The constellation map is used by a mapping function (106) to convert the random bits generated by the QRNG into QKD symbols. The mapping function (106) may be performed by a computer or circuitry configured to map the random bits of the random key according to the constellation map to generate QKD symbols. At the output of the mapping function (106), IQ quadrature values are generated. The IQ quadrature values are converted into an electrical analog control signals for the IQ electro-optical modulator (107). The phase and amplitude of the horizontal polarization of the source signal generated by the laser (101) is modulated using the IQ electro-optical modulator (107) to generate a modulated optical signal consisting of symbols $S_i$ resulting from conversion of corresponding random bits $R_i$. This modulated optical signal is also referred herein as the QKD signal or QKD symbols. The modulation is performed by the IQ electro-optical modulator (107) under the control of the electrical control signal converted into an optical modulation signal by the IQ electro-optical modulator (107). The IQ electro-optical modulator (107) may be an IQ dual polar modulator, for example, a Lithium Niabate electro-optics modulator.

In one or more embodiments, the QKD symbols $S_i$ resulting from conversion of random bits $R_i$ are multiplexed temporally with QPSK pilot symbols $P_j$. The interleaved symbols are noted $X_k$. The interleaving may be performed digitally, e.g. by a computer or digital circuitry. The QKD symbols (e.g. PCS 1024 QAM symbols) may be interleaved with the pilot symbols by a computer or digital circuitry (e.g. by the mapping function (106)) before being fed to the IQ modulator. The interleaved symbols are sent to an Arbitrary Waveform Generator, AWG, whose analog output are fed to the IQ modulator (107) (e.g. IQ dual polar modulator). The AWG may be a high-performance Digital to Analog Converter.

The CV-QKD protocols requires that only a few photons per symbols are sent by Alice. This constraint imposes very low optical transmitted power. Hence, Bob receives a particularly noisy and low power signal (<<0 dB). In such conditions classical DSP algorithms for coherent detection tend to perform very poorly. To allow Bob to retrieve Alice's data in a more efficient way, the QKD symbols are interleaved in time with QPSK pilots symbols with higher amplitude such that the variance of the pilots symbols is $V_{pil} > V_A$. The frequency of these pilots P, and the interleaving pattern may be optimized depending on the quality of the unsecured quantum channel: it may be 1 pilot symbol P, after 2 QKD symbols $S_i$, 1 pilot symbol $P_j$ after 3 QKD symbols $S_i$, 2 pilot symbols $P_j$ after 2 QKD symbols $S_i$, etc. This approach is different from the approach using pilot-tone multiplexed in both frequency and polarization. It has the advantage of being more optimal in term of bandwidth occupation. It is also simpler to implement.

Figure 1B:
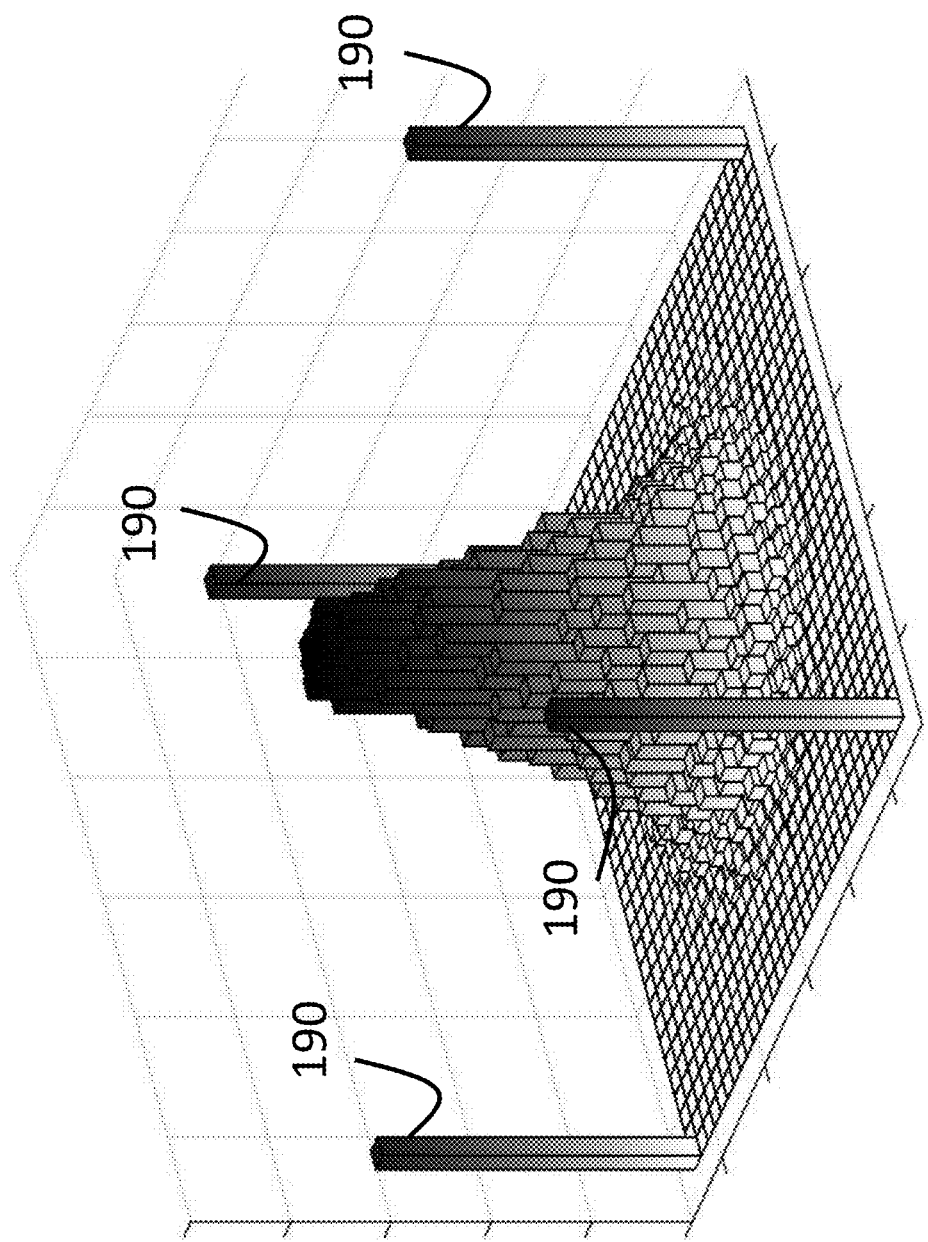
FIG. 1B illustrates aspects of signal modulation according to one or more examples.

In FIG. 1B, a PCS 1024 QAM distribution is shown together with the QPSK pilot symbols. The PCS 1024 QAM allows a discrete and precise approximation of a Gaussian source signal. The QKD constellation is visible in the centre of the distribution and recognizable by its Gaussian form. The QPSK pilot symbols (190) are also clearly identified as 4 bars located at the extreme points of the distribution. For QPSK, 4 pilot symbols are used, each pilot signal corresponding to a point on a constellation diagram, the 4 points being equispaced around a circle. All the QPSK pilot symbols have therefore the same amplitude and have known phase values equally distributed. E.g. for QPSK, 4 pilot symbols are used having respective fixed phases values 45°, 135°, 225° and 315°.

Back to FIG. 1A, the apparatus (100A) further includes an optical attenuator (108) configured to adjust the power of the output symbols $(X_k)$ after interleaving. The signal power is adjusted so that the variance of the symbols after amplification is for example set to a given value $V_A$ (expressed in Shot Noise Units (SNU)). The adjustment may come from QKD security proofs that prove that there exists an optimal $V_A$ such that the key rate is maximal. The optimal $V_A$ is given by security proofs and depends on the transmission parameters (e.g. T, x, where T is the transmittance of the channel, x is the variance of the excess noise, i.e. the increase in noise caused by Eve) and or the length of the optical fiber (120).

The amplified optical signal is transmitted to Bob (receiver side) through an unsecure quantum channel, here an optical channel being an optical fiber (120). The unsecure quantum channel attenuates the transmitted optical signal by the transmittance T and adds excess noise having a variance $\xi$. Excess noise also comes from system and DSP (115) impairments. An authenticated classical channel (130) may be used in parallel as explained in introduction.

The quantum shot noise is the noise induced by quantum uncertainty of the measurement. It may be modelled as a white additive Gaussian noise. By estimating the excess noise compared to the quantum shot noise, we obtain a bound on the increase of noise induced by Eve's measurement. The variance $\xi$ of the excess noise (in SNU, Shot Noise Unit) is an important parameter for measuring the system performance. The higher it is the shorter will be the length of the secure key that can be extracted from the random data left untouched by Eve. Therefore, it is a challenge to propose algorithms as optimal as possible.

The variance $V_A$ and values of the power of the QKD symbols, the excess noise, the power of the total noise in CVQKD system may be given in Shot Noise Unit (or SNU). If $N_o$ is the value of the shot noise power (in W for example), then the power of the QKD modulation is $V_A N_G$ in W.

The apparatus (100B) at receiver side includes a laser (111) and coherent receiver (112) for coherent detection of the successive symbols $(Y_k)$. The laser (111) is a local oscillator configured to beat with the received signal and to convert the received signal to a baseband signal. It is used for coherent detection. The coherent receiver is configured to decode the optical signal received through the fiber (120) and to extract an electrical signal representing the successive symbols $(Y_k)$. The coherent receiver may for example include an array of photodetectors for optical to electrical conversion. The decoded electrical signal may then be converted to a digital decoded signal by an analog to digital converter.

The coherent receiver (112) includes photodiodes having a quantum efficiency n defined as the ratio of the average number of output electrons to the average number of input photons. The coherent receiver (112) adds noise, such that the variance of the total noise at receiver side is $1+V_{el}$ where 1 is the variance of the shot noise and $V_{el}$ is the variance of the thermal electrical noise from the receiver (100B). The symbols received and extracted at Bob's apparatus are noted $(Y_k)$.

The apparatus (100B) also include a digital signal processing (DSP) circuitry (115) for determining the QKD symbols $(S_k)$ from the extracted symbols $(Y_k)$. The main two signal distortions caused by the apparatuses (100A) and (100B) and propagation through the fiber are polarization mixing and carrier phase noise.

Figure 2A:
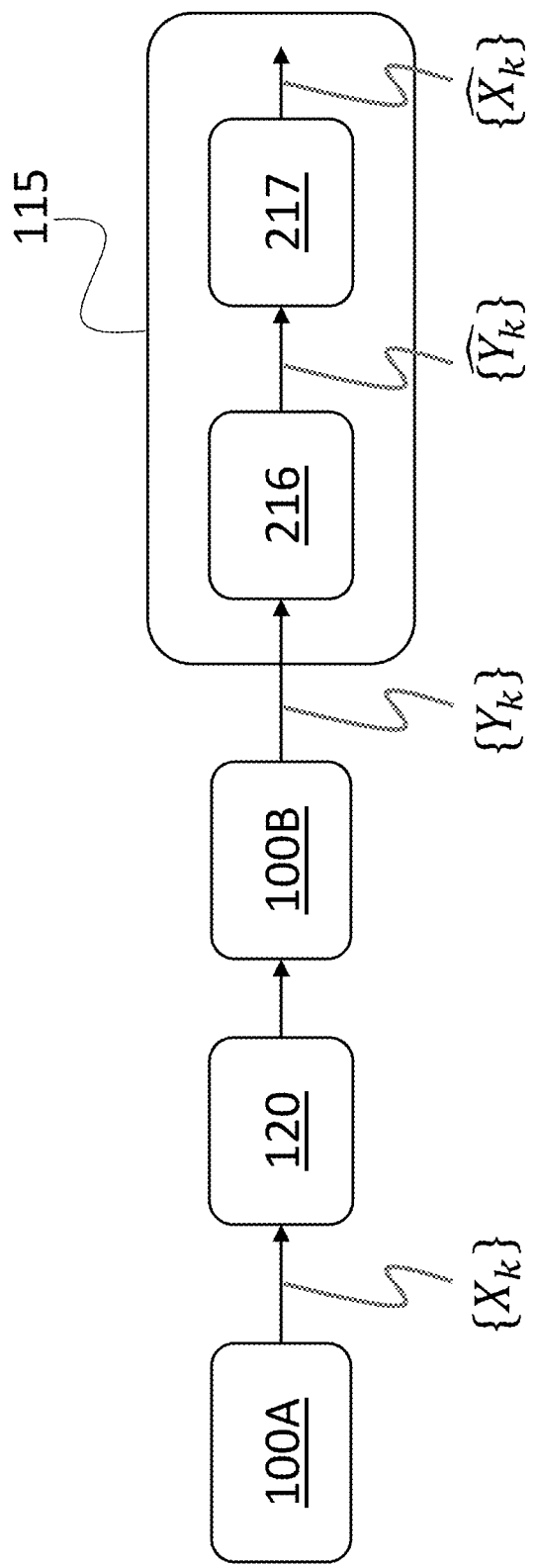
FIG. 2A shows a schematic illustrating a device for random key decoding in QKD system according to one or more examples.

FIG. 2A shows a schematic representation of a CVQKD system including a digital signal processing (DSP) circuitry (115) for determining the QKD symbols $(S_k)$ from the extracted symbols $(Y_k)$. In this embodiment, only the two impairments polarization mixing and carrier phase noise are considered: to each received symbol $Y_k$ a polarization correction is applied to generate a first corrected symbol $\hat{Y}_k$, followed by a carrier phase correction applied to the first corrected symbol $\hat{Y}_k$, to generate a second corrected symbol $\hat{X}_k$ representing an estimate of the symbol $X_k$ transmitted by Alice. The notation used in this schematic will be used in the following description. The polarization correction may be applied by a first circuitry (216) and the carrier phase correction by a second circuitry (217) as represented by FIG. 2A, or both corrections be performed by a same circuitry.

Polarization Correction

The purpose of Polarization Correction is to apply a correction to cancel the effects of changes of polarization state caused by birefringence of the optical fiber (120). A change of the polarization state may be caused for example by twists of the fiber (120).

Polarization of light can be described using either 2D complex vectors in the Jones space or 3D real vectors in the Stokes space. The proposed algorithm makes use of the matching relationships between both formalisms. See for example the article by J. P. Gordon and H. Kogelnik, entitled 'PMD fundamentals: Polarization mode dispersion in optical fibers', *PNAS*, vol. 97, no. 9, pp. 4541-4550, April 2000, doi: 10.1073/pnas.97.9.4541.

Jones' formalism is a matrix formalism allowing to describe the polarization state of light wave, or in a general way, of an electromagnetic wave, and its evolution through an optical system.

With the Jones formalism a 2D complex Jones vector is noted $$s = \begin{pmatrix} s_x \\ s_y \end{pmatrix}$$

where $s_x$ is the horizontal component of the electric field of the light wave and $s_y$ the vertical component of the electric field of the light wave, $s_x$ and $s_y$ being a complex defining I and Q quadrature values. This vector $$s = \begin{pmatrix} s_x \\ s_y \end{pmatrix}$$

defines the polarization state of the electric field of the light wave at a given time. A 2×2 complex Jones unitary matrix describing a change of the polarization state of of the electric field of the light wave is noted U with $\det(U)=1$ and $UU^\dagger=I$.

With the Stokes formalism, the polarization state of the electric field of a light wave may be defined by a 3D real Stokes vector $$\check{s} = \begin{pmatrix} s_1 \\ s_2 \\ s_3 \end{pmatrix}$$

with $$s_1^2+s_2^2+s_3^2=1. \tag{EQP}$$

A change of the polarization state may be modelled in the Stokes formalism by a 3×3 real rotation matrix R isomorphic to U.

The relationship between the Stokes vector š and the associated Jones vector s is given by the following equations (EQS):

$$s_1 = s_x s^*_x - s_y s^*_y$$

$$s_2 = s_x s^*_y + s^*_x s_y$$

$$s_3 = j(s_x s^*_y - s^*_x s_y)$$

Propagation through a fiber rotates the Stokes vector of the light wave. Let R be the 3×3 rotation operator in Stokes formalism, ř a unitary vector (with quadratic norm equal to 1) defining the rotation axis and ψ the rotation angle. Any vector colinear with ř is left untouched by the rotation operator. Thus, in the Jones space, the vectors r and r_ associated respectively with ř and −ř must be eigenvectors of U, the Jones matrix associated with R. Since r and r_ are orthogonal, U can be decomposed as:

$$U=\lambda_1 r^\dagger r + \lambda_2 r_{-}^\dagger r_{-} \tag{EQ1}$$

where $\lambda_1$ and $\lambda_2$ are the eigenvalues of U and $r^\backslash$ designates the conjugate transposed vector of r. Moreover from $UU^\dagger=I$ and $\det(U)=1$ we deduce $|\lambda_1|=|\lambda_2|=1$ and $\lambda_1\lambda_2=1$. Hence:

$$U=e^{-j\psi/2}r^\dagger r + e^{j\psi/2}r_{-}^\dagger r_{-} \tag{EQ2}$$

where the angle ψ is the rotation angle according to the article by J. P. Gordon and H. Kogelnik. This is obtained by retrieving the expression of R using this last expression of U. Moreover (EQ2) can be proven equivalent to:

$$U=\cos(\psi/2)I_2 - j\sin(\psi/2)(r_1\sigma_1+r_2\sigma_2+r_3\sigma_3) \tag{EQ3}$$

where $\sigma_1$, $\sigma_2$ and $\sigma_3$ are the Pauli matrices:

$$\sigma_1 = \begin{pmatrix} 1 & 0 \\ 0 & -1 \end{pmatrix}$$

$$\sigma_2 = \begin{pmatrix} 0 & 1 \\ 1 & 0 \end{pmatrix}$$

$$\sigma_3 = \begin{pmatrix} 0 & -j \\ j & 0 \end{pmatrix}$$

and $r_1$, $r_2$ and $r_3$ are the components of the rotation axis $$\check{r} = \begin{pmatrix} r_1 \\ r_2 \\ r_3 \end{pmatrix}$$

and $I_2$ is the identity matrix of dimension 2

This equation (EQ3) is used to compute the Jones matrix U from the rotation matrix R. The determination of the rotation matrix from the received symbols is described in more details below.

For a given symbol $X_k$ with transmitted information only on the horizontal polarization noted $$X_k = \begin{pmatrix} x_k \\ 0 \end{pmatrix}$$

in the Jones space, the received symbol $Y_k$ is a rotated and noisy version of this vector with the phase noise $\phi_k$ that varies over time, Jones matrix U and additive noise $w_k$ that may be modelled in the Jones space by:

$$Y_k = e^{j\phi_k}UX_k + W_k$$

The angle $\phi_k$ represents a variation of phase caused by the laser (101) at Alice's apparatus or more generally a phase noise on the phase of the source signal generated by the laser (101). The additive noise $w_k$ may include shot noise. It may also include additive noise from the electrical components. The additive noise $w_k$ is modelled here as an additive white Gaussian noise.

Figure 3:
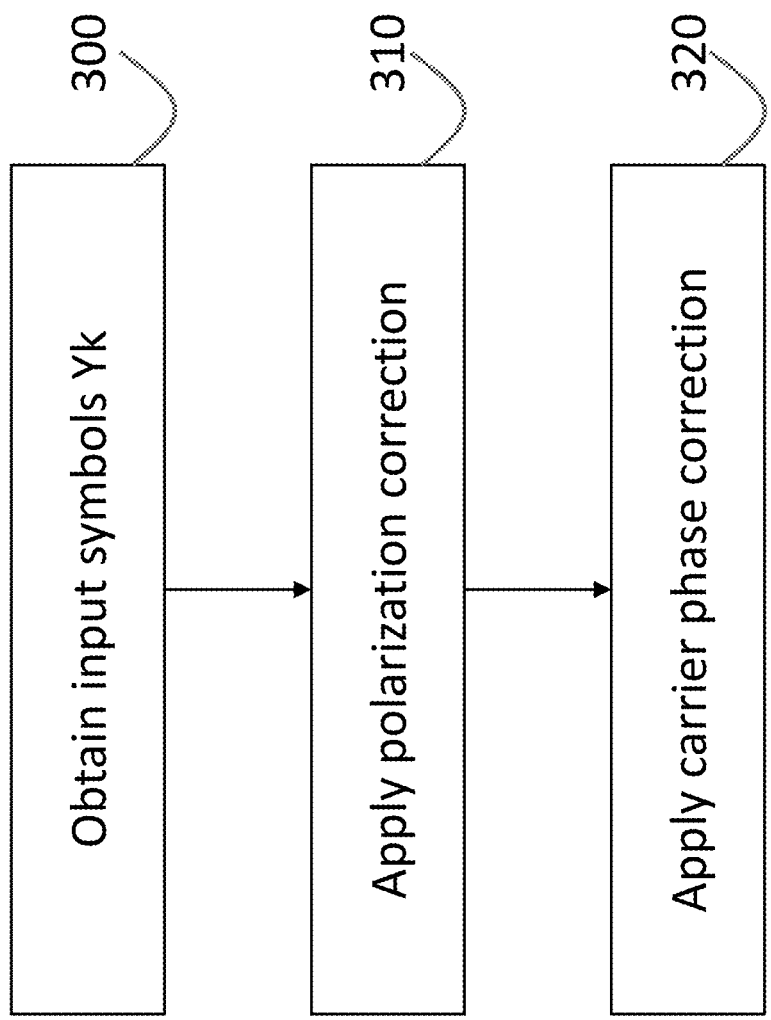
FIG. 3 shows a flow chart of a method for random key decoding in QKD system according to one or more examples.
Figure 4:
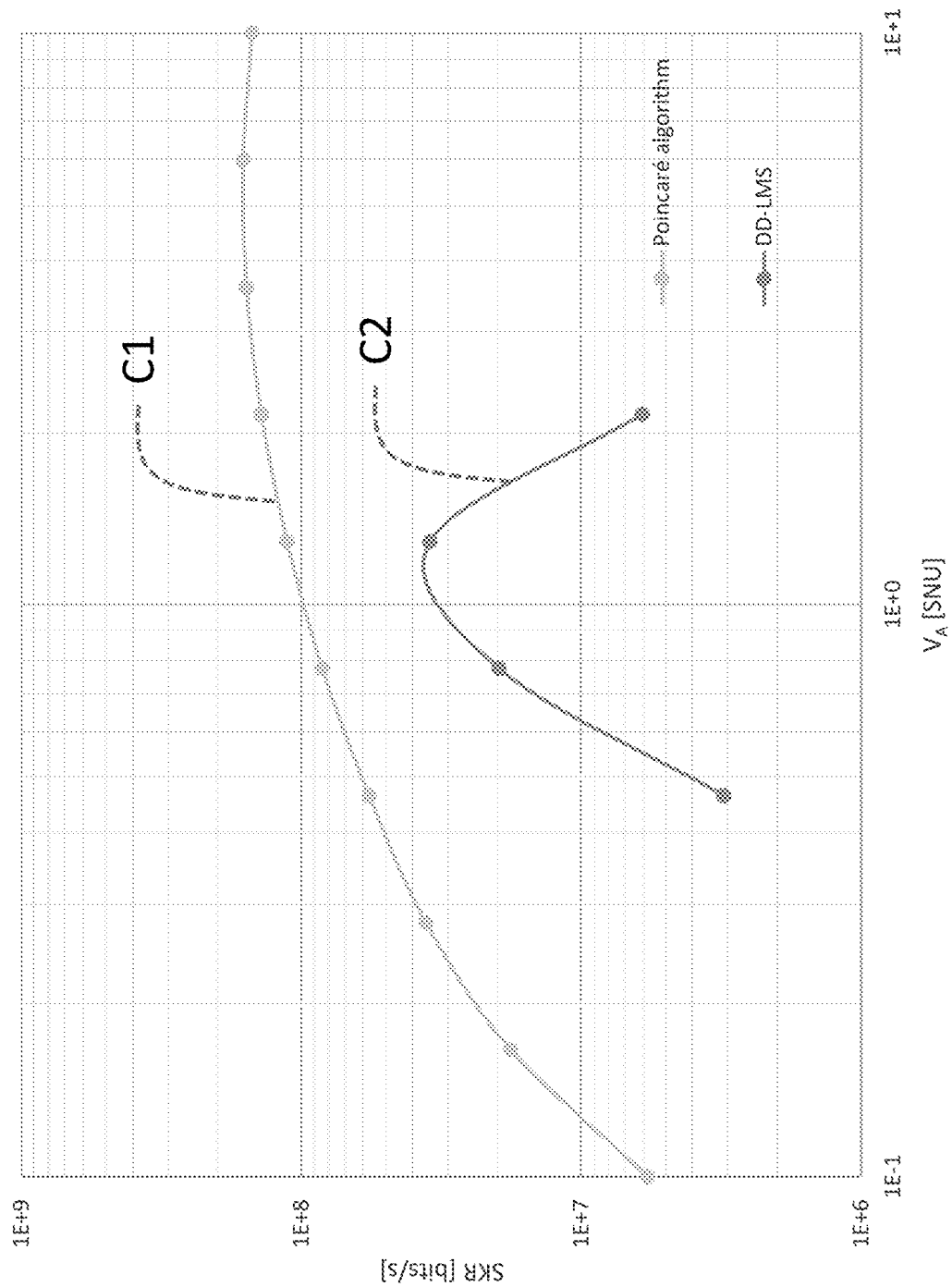
FIG. 4 illustrates performance of a QKD system according to one or more examples.

The Stokes vector associated to $X_k$ is $$\tilde{x}_k = \begin{pmatrix} 1 \\ 0 \\ 0 \end{pmatrix}$$

whatever the value of $x_k$. As represented by FIG. 3, the Stokes vector $\tilde{x}_k$ is on a Poincaré sphere (200) of radius equal to 1 defined by equation (EQP) in Stokes space. Because of the additive noise $W_k$ the Stokes vectors $\tilde{s}_k$ (210) of the received symbols ($Y_k$) are indeed randomly distributed around a vectors $\tilde{s}$ as depicted in FIG. 3. The Stokes vector $\tilde{s}_k$ of a decoded symbol $Y_k$ can be computed using the equations (EQS). By linear regression on this randomly distributed Stokes vectors $\tilde{s}_k$ (210), a regression vector $\tilde{s}$ of the noiseless polarization state of the electrical field can be obtained. By this computation method, the noiseless polarization state independent from the phase noise of the single polarization optical field, the phase noise being not detectable in the Stokes space. This computation method is referred herein to as a Poincaré sphere-based polarization alignment algorithm. This computation method may be applied to all the symbols, whether QKD symbols or pilots symbols or be applied only to the pilot symbols.

The rotation axis $\tilde{r}$ and the rotation angle $\psi$ are estimated in Stokes space from the Stokes vector is $\tilde{x}_k$ and the regression vectors $\tilde{s}$. We remind that $$\tilde{x}_k = s_o = \begin{pmatrix} 1 \\ 0 \\ 0 \end{pmatrix}.$$

The rotation axis $\tilde{r}$ is one of two vectors normal to the plane formed by $s_o$ and $\tilde{s}$. $\tilde{r}$ is for example the 3×1 real vector defined as:

$$\tilde{r} = \begin{pmatrix} r_1 \\ r_2 \\ r_3 \end{pmatrix} = \begin{pmatrix} 0 \\ -s_3 \\ s_2 \end{pmatrix}$$

where $\tilde{s} = \begin{pmatrix} s_1 \\ s_2 \\ s_3 \end{pmatrix}.$

The rotation angle $\psi$ is estimated as the angle $\hat{\psi}$ between the two vectors $s_o = \tilde{x}_k$ and $\tilde{s}$. Then the Jones matrix U is computed in the Jones space using (EQ3) in which the angle $\psi$ is replaced by the estimated rotation angle $\hat{\psi}$, the rotation axis is $$\tilde{r} = \begin{pmatrix} r_1 \\ r_2 \\ r_3 \end{pmatrix} = \begin{pmatrix} 0 \\ -s_3 \\ s_2 \end{pmatrix}$$

such that $\hat{U} = \cos(\hat{\psi}/2)I_2 - j \sin(\hat{\psi}/2)(-s_3\sigma_2 + s_2\sigma_3)$ Finally, the inverse Jones matrix is computed by $\hat{U}^{-1} = \hat{U}^\dagger$ (transposed and conjugate of matrix $\hat{U}$) and a first corrected symbol $\hat{Y}_k = \hat{U}^{-1} Y_k$ is computed for each received symbol $Y_k$.

This represents the result of the polarization correction applied to $Y_k$. It is to be noted here that as the matrix $\hat{U}^{-1}$ is a unitary matrix, it changes the noise, but not its characteristics (the noise remains an additive white Gaussian noise) and therefore one can write $\hat{Y}_k = \hat{U}^{-1} Y_k = e^{j\phi_k} X_k + W_k$.

In an optical system, as the polarization state might change with time, the linear regression to compute the estimate $\tilde{s}$ of the noiseless polarization state may be applied on a sliding window, e.g. on a given number K of Stokes vectors $\tilde{s}_k$ representing the K last decoded symbols $Y_k$. Likewise, the inverse Jones matrix may be computed periodically and over a sliding window.

Carrier Phase Correction

The purpose of Carrier Phase Correction is to apply a correction to cancel the effects of the variation of phase noise caused by the linewidth of the laser beam.

The phase noise is determined for the pilot symbols and then the phase noise can be approximated for the QKD symbols. Alice and Bob share the knowledge concerning the pilots and their interleaving pattern, i.e. the phase of the pilots and the order in which the pilot are sent by Alice is known to Bob and may be shared between Alice and Bob (for example through the classical communication channel).

The Carrier Phase Correction allows the determination of the phase noise. The Carrier Phase Correction is applied only to the corrected pilot symbols $\hat{Y}_k$ corresponding to a pilot. The Carrier Phase Correction may be based on an Extended Kalman Filter and on the QPSK pilots. The principle is to estimate the phase noise $\phi_k$ at time k for the symbol $X_k$ based on the observation $\hat{Y}_k$ when the symbol $X_k$ is a pilot $P_j$. For simplification reasons, for the description of the Kalman filter, the index k will be used as the pilot index, bearing in mind that the Kalman filter is applied only to the pilot symbols.

It is also reminded here that the pilot symbols $P_j$ are interleaved in time with the QKD symbols $S_i$ and the interleaving scheme (interleaving pattern and rate) is known to the receiver (100B). Also the receiver (100B) knows the order in which the pilots are sent. Therefore the symbol $X_k$ corresponding to the received symbol $Y_k$ is known to the receiver when $X_k$ is a pilot.

A Kalman filter is applied to the scalars in the first component of $X_k$ and $\hat{Y}_k$ that are defined as vectors:

$$X_k = \begin{pmatrix} x_k \\ 0 \end{pmatrix},$$

$$W_k = \begin{pmatrix} w_k^{(1)} \\ w_k^{(2)} \end{pmatrix}$$

$$\hat{Y}_k = \begin{pmatrix} \hat{y}_k \\ w_k^{(2)} \end{pmatrix} \begin{pmatrix} x_k e^{j\phi_k} + w_k^{(1)} \\ w_k^{(2)} \end{pmatrix}.$$

The observation model used for the Kalman Filter is applied to scalars corresponding to the first component of the vectors and is the following:

$\hat{y}_k = x_k e^{j\phi_k} + w_k^{(1)}$ or $\hat{y}_k = h_k(\phi_k) + w_k^{(1)} = x_k e^{j\phi_k} + w_k^{(1)}$ and the state transition model is $\hat{\phi}_k = f_k(\hat{\phi}_{k-1}) + \omega_k = \hat{\phi}_{k-1} + \omega_k$ where $w_k$ is the additive noise, assumed to be a random variable having a Gaussian distribution whose mean is zero and variance $\sigma^2$ is an experimental value that may be calibrated in various ways (e.g. the signal input of the coherent receiver may be shut down to estimate the additive noise variance) before the QKD transmission and can also be optimized during transmission.

The additive noise $\omega_k$ on phase is assumed to be a random variable having a Gaussian distribution whose mean is zero and variance $\delta^2$. The additive noise $\omega_k$ is induced by both the source laser (101) and the laser (111) at receiver side. The phase noise $\phi_k$ is here modelled here as a Wiener process along a straight line. The variance of this Wiener process is defined as $\delta^2=2\pi\delta v/f_s$ where $\delta v$ is the full width half maximum linewidth of both lasers (101) and (111) at sender and receiver and $f_s$ the symbol rate of the pilots (e.g. number of pilots per second). The purpose is to obtain an estimate of the phase noise $\phi_k$ of the carrier phase on the pilots.

The Kalman filter works as follows. A predicted state estimate is defined as $$\hat{\phi}_{k|k-1}=\hat{\phi}_{k-1}$$

A predicted variance estimate is defined as $$P_{k|k-1}=P_{k-1}+\delta^2$$

The initial values of $\hat{\phi}_{k|k-1}$ and $P_{k|k-1}$ may be arbitrary defined (e.g. equal to 0). The algorithm may be applied firstly during a convergence phase to achieve convergence of the values. Then, when we compute the excess noise, we can get rid of the values used for the first symbols. The value $\hat{\phi}_0$ is the initial value of $\hat{\phi}_{k|k-1}$ for k=0 and may also be arbitrary.

The following parameters are defined:

Innovation: $\tilde{y}_k=y_k-h_k(\hat{\phi}_{k|k-1})=y_k-x_k e^{j\hat{\phi}_{k-1}}$ Innovation variance: $S_k=|H_k|^2 P_{k|k-1}+\delta^2$ Near-optimal Kalman gain: $K_k=P_{k|k-1}H_k^{554}S_k^{-1}$ Updated state estimate: $\hat{\phi}_k=\hat{\phi}_{k|k-1}+K_k\tilde{y}_k$ Updated covariance estimate: $P_k=P_{k|k-1}-|K_k|^2 S_k$ where $$H_k=h'_k(\hat{\phi}_{k|k-1})$$

$$h_k(\phi)=x_k e^{j\phi_k}$$

$$h'_k(\phi)=jx_k e^{j\phi_k}$$

where $h'_k$ may be seen as the derivative of $h_k(\phi)$.

For each k, the following computation steps are performed:

$$H_k=J^*e^{j\hat{\phi}_{k-1}}x_k,$$

where $$X_k = \begin{pmatrix} x_k \\ 0 \end{pmatrix}$$

is a pilot symbol, $$P_{k|k-1}=P_{k-1}+\delta^2$$

$$\tilde{y}_k=y_k-h_k(\hat{\phi}_{k|k-1})=y_k-x_k e^{j\hat{\phi}_{k-1}}$$

$$S_k=|H_k|^2 P_{k|k-1}+\delta^2$$

$$K_k=P_{k|k-1}H_k^{554}S_k^{-1}$$

$$\hat{\phi}_k=\hat{\phi}_{k|k-1}+K_k\tilde{y}_k$$

$$P_k=P_{k|k-1}-|K_k|^2 S_k$$

Then these steps are repeated for k=k+1 where k is the pilot index.

After the Kalman filter, a moving average or low pass filter may be applied to the values of the estimated phase noise $\hat{\phi}_k$. The window size for this moving average may for example be of 2 to 4 values of the estimated phase noise $\hat{\phi}_k$. The size of this window may be adjusted such that more than two pilot symbols are used for estimating the phase noise for a QKD symbol.

A linear interpolation of the phase noise determined for two or more pilots is used to compute an estimate of the phase noise for the QKD symbols. For example, the phase noise $\hat{\phi}_k$ at time k (here the index k is the time index or symbol index: for each value of k, $\hat{Y}_k$ may be a pilot symbol $P_j$ or a QKD symbol $S_i$) corresponding to a QKD symbol $X_k$ may be determined by a linear interpolation as $\hat{\phi}_k=(\hat{\phi}_{k-1}+\hat{\phi}_{k+1})/2$ if $\hat{\phi}_{k-1}$ and $\hat{\phi}_{k+1}$ are the phase noise values determined respectively for a previous pilot symbol $X_{k-1}$ and a next pilot symbol $X_{k+1}$ and $X_k$ is interleaved between these pilot symbols $X_{k-1}$ and $X_{k+1}$. When two QKD symbols or more are interleaved between two pilots, the coefficients of the linear interpolation may be adapted to the number of QKD symbols interleaved between two pilot symbols. For example, when 2 QKD symbols $X_{k+1}$ and $X_k$ are interleaved between two pilots $X_{k-1}$ and $X_{k+2}$:

$$\hat{\phi}_k=(2\hat{\phi}_{k-1}+\hat{\phi}_{k+2})/3$$

and $$\phi_{k+1}=(\hat{\phi}_{k-1}+2\hat{\phi}_{k+2})/3.$$

Once the phase noise $\hat{\phi}_k$ at time k corresponding to a QKD symbol $X_k$ is obtained, the first component $\hat{x}_k$ of the vector $X_k$ can be estimated by computing:

$$\hat{x}_k=e^{-j\hat{\phi}_k}\hat{y}_k$$

using the first component $\hat{y}_k$ of the vector $\hat{Y}_k$ resulting from the Polarization Correction.

Figure 2B:
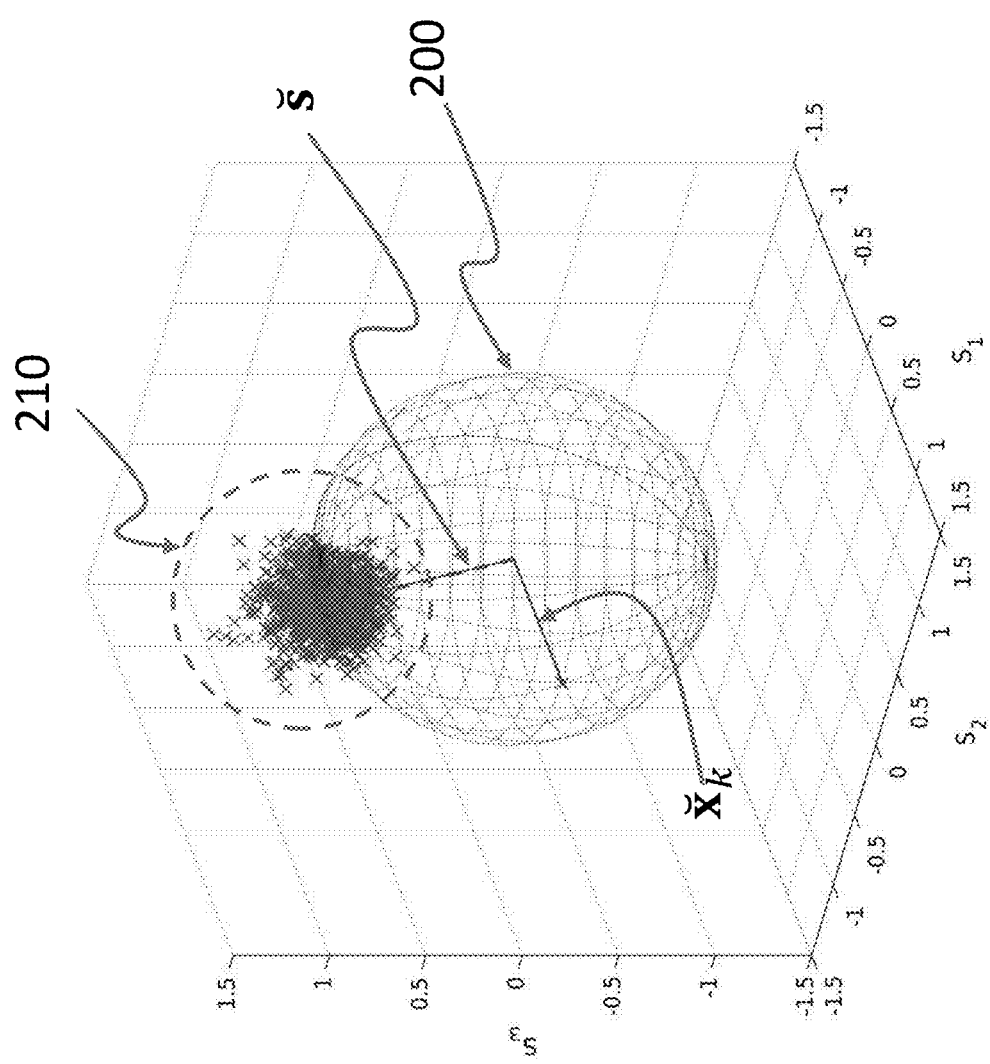
FIG. 2B illustrates aspects of a device and method for random key decoding according to one or more examples.

The determination of the rotation matrix R representing the polarization impairment as described by reference to FIGS. 2A and 2B may be performed on the basis of input symbols including pilot symbols and QKD symbols or alternatively on the basis only to the input symbols $Y_k$ corresponding to pilot symbols (but not to the QKD symbols).

Figure 2C:
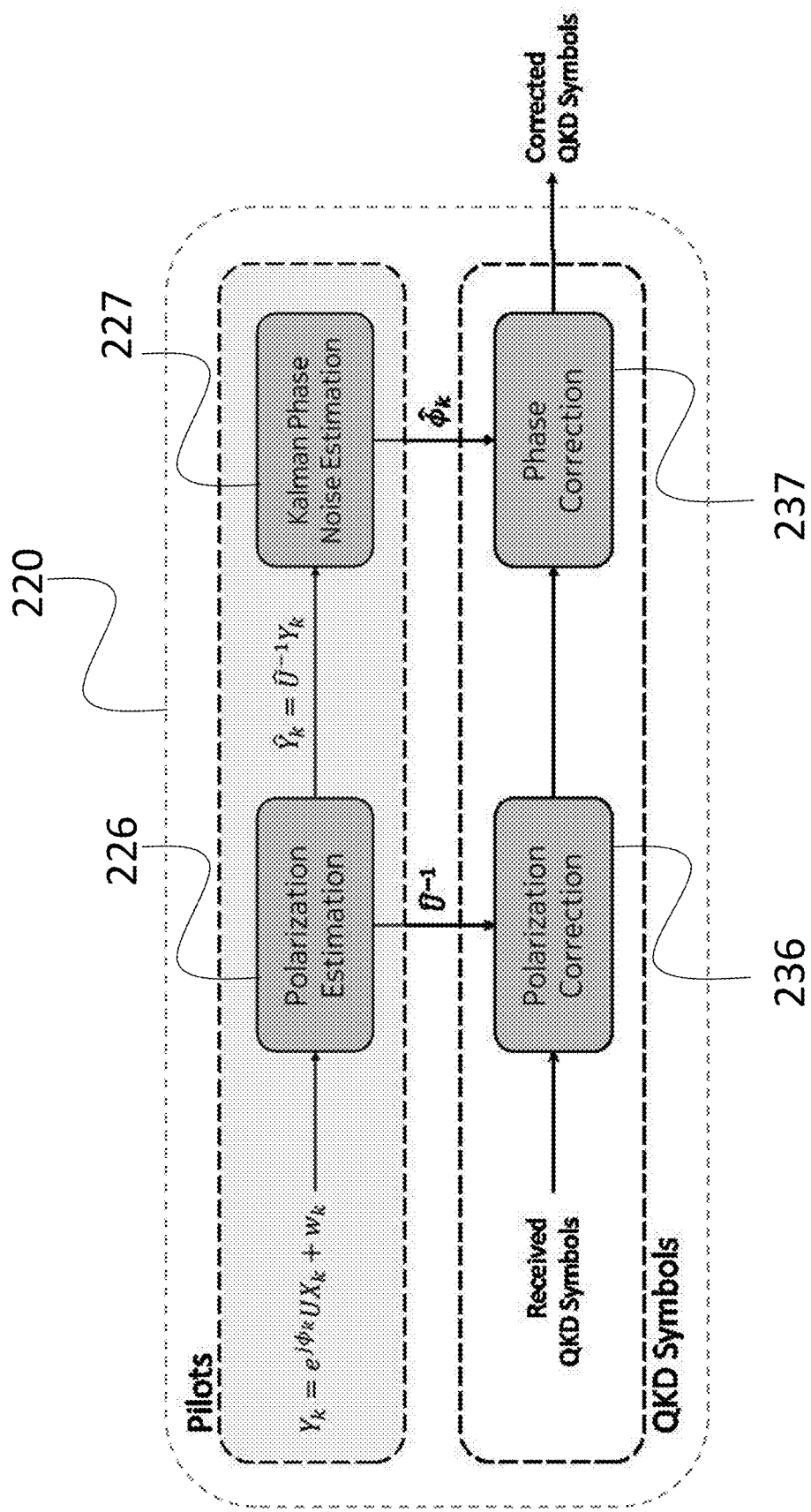
FIG. 2C shows a schematic illustrating a device for random key decoding in QKD system according to one or more examples.

FIG. 2C shows a schematic view of an apparatus (220) for processing input symbols at receiver side. The input symbols include QPSK pilot symbols temporally multiplexed with QKD symbols representing random bits of at least one random key. The quadratures values of QKD symbols follow a modulation map, corresponding to a QAM-based PCS modulation map. The apparatus includes means (226, 227) for processing the pilot symbols and means (236, 237) for processing the QKD symbols.

The means (226, 227) for processing the pilot symbols may include a circuitry (226) configured to perform polarization estimation only on the pilot symbols (but not to the QKD symbols). This polarization estimation circuitry (226) may be based on the determination of a rotation matrix R in the Stokes space representing the polarization impairment and the determination of the inverse matrix $\hat{U}^{-1}$ as described by reference to FIGS. 2A and 2B. The inverse matrix $\hat{U}^{-1}$ is applied in a Jones space to the QKD symbols by a circuitry (236) configured to perform polarization correction and generate first corrected symbols $\hat{Y}_k=\hat{U}^{-1}Y_k$, either first corrected QKD symbols or corrected pilot symbols.

The determination of the rotation matrix may include:
converting the pilot symbols into corresponding vectors in the Stokes space;
performing a linear regression on the vectors to obtain a regression vector ($\tilde{s}$);
determining a rotation matrix in the Stokes space from the regression vector ($\tilde{s}$).

The determination of the inverse matrix may include:
converting the rotation matrix to a Jones matrix in the Jones space;
inversing the Jones matrix in the Jones space to obtain the inverse matrix.

The means (226, 227) for processing the pilot symbols may include another circuitry (227) for performing phase noise estimation on the pilot symbols. This phase noise estimation circuitry (227) may be based on the Kalman filter as described by reference to FIG. 2A and is configured to generate estimated phase noise values $\hat{\phi}_k$ for the pilot symbols. These estimated phase noise values $\hat{\phi}_k$ are used by a circuitry (237) configured to apply a phase correction to the first corrected QKD symbols $\hat{Y}_k$ and generate second corrected QKD symbols $\hat{x}_k = e^{-j\hat{\phi}_k}\hat{y}_k$ (or $\hat{X}_k = e^{-j\hat{\phi}_k}\hat{Y}_k$).

Applying a phase correction to a first corrected QKD symbols $\hat{Y}_k$ may include estimating a phase noise value for the corresponding QKD symbol by applying a linear interpolation to phase noise values estimated for at least a first pilot symbol and at least one second pilot symbol between which the QKD symbol is temporally interleaved and applying the estimated phase noise value obtained for a QKD symbol to perform a phase correction on a first QKD corrected symbols $\hat{Y}_k$ corresponding to the concerned QKD symbol.

FIG. 3 shows a flowchart of a method for monitoring smart devices according to one or more example embodiments. The steps of the method may be implemented by an apparatus for random key decoding according to any example described herein.

At step 300, input symbols are obtained. The input symbols include Quadrature Phase Shift Keying, QPSK, pilot symbols temporally multiplexed with QKD symbols representing random bits to be used for random key transmission and quantum key generation. The quadratures values of the QKD symbols follow a modulation map that is a QAM-based PCS modulation map defining a mapping function for the random bits.

At step 310, a polarization correction is applied to the input symbols to generate respectively first corrected QKD symbols and corrected pilot symbols. The polarization correction is based at least on the pilot symbols. The polarization correction may be determined based on the pilot symbols only or based on the input pilot symbols and the input QKD symbol.

At step 320, a carrier phase correction is applied to the first QKD corrected symbols to generate second corrected QKD symbols representing an estimate of the at least one random key. The carrier phase correction is determined based on the corrected pilot symbols obtained at step 310.

Applying the polarization correction may include determining a rotation matrix in a Stokes space representing a polarization impairment based at least on the pilot symbols, determining an inverse matrix of the Jones matrix associated to the rotation matrix and applying in a Jones space the inverse matrix to vectors representing the QKD symbols.

Determining the rotation matrix may include:
converting input symbols into corresponding vectors in the Stokes space;
performing a linear regression on the vectors to obtain a regression vector ($\tilde{s}$);
determining a rotation matrix in the Stokes space from the regression vector ($\tilde{s}$);

Determining the inverse matrix may include:
converting the rotation matrix to a Jones matrix in the Jones space;
inversing the Jones matrix in the Jones space to obtain the inverse matrix.

Applying the carrier phase correction may include applying a Kalman filter to the corrected pilot symbols obtained from corresponding pilot symbols to estimate corresponding phase noise values for the corresponding pilot symbols and estimating a phase noise value of a QKD symbol by applying a linear interpolation to phase noise values estimated for at least a first pilot symbol and at least one second pilot symbol between which the QKD symbol is temporally interleaved.

Numerical Simulation Results and Performance

FIG. 2 show a comparison of Poincare sphere-based polarization demultiplexing algorithm described herein (curve C1) and DD-LMS (Direct Detection Least Mean Square) algorithm (curve C2) in term of SKR (Secret or Secure Key Rate) as a function of the modulation variance $V_A$ used at Alice's apparatus and using a 25 km optical fiber. The DD-LMS is for example described by K. Kikuchi, 'Fundamentals of Coherent Optical Fiber Communications', J. Lightwave Technol., JLT, vol. 34, no. 1, pp. 157-179, January 2016. The DD-LMS uses coherent transmission and detection. The method described herein clearly outperforms the DD-LMS algorithm and allows to achieve higher SKR. Moreover, it exhibits key rates of 100 Mbps and higher.

Figure 5:
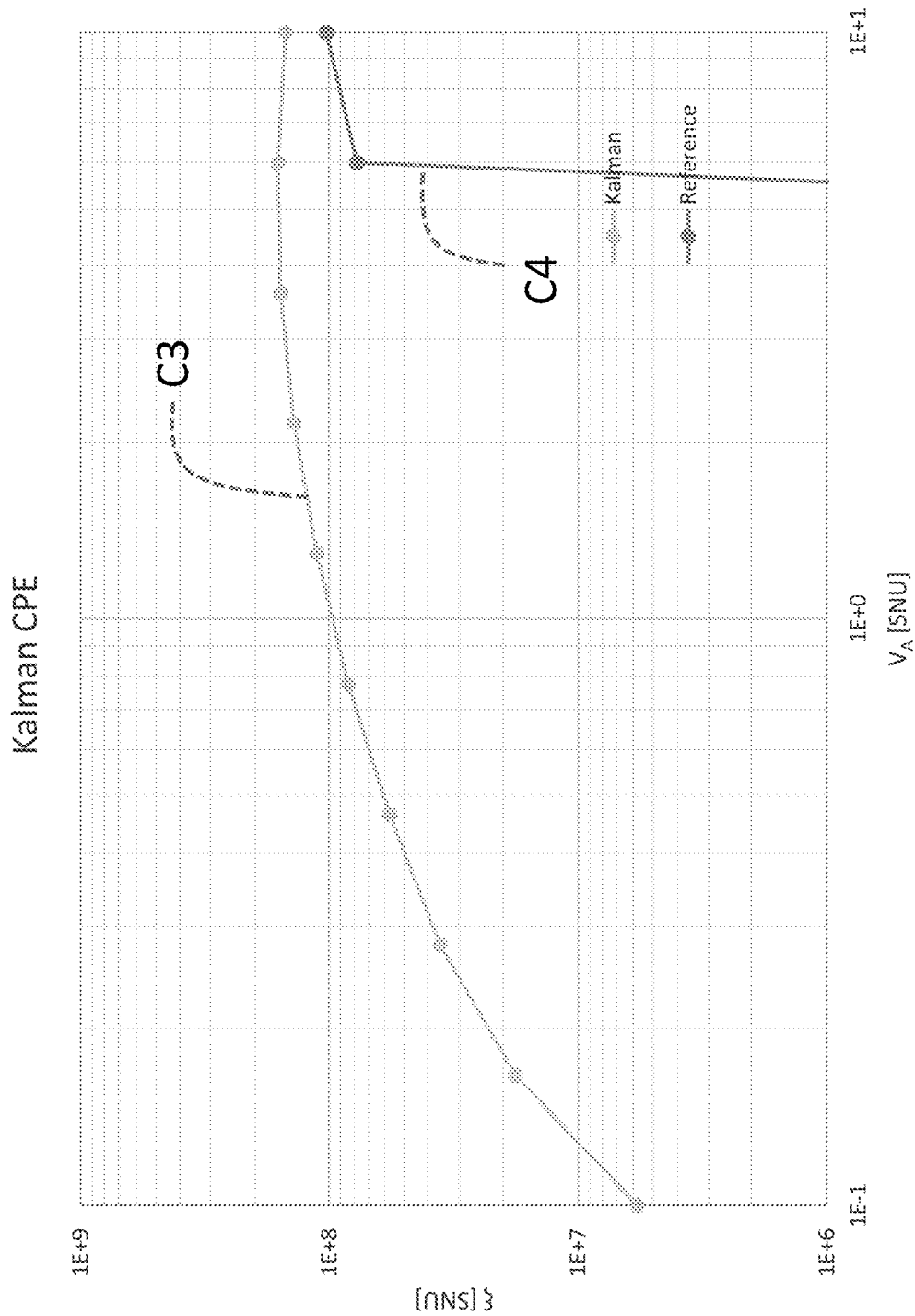
FIG. 5 illustrates performance of a QKD system according to one or more examples.

FIG. 5 shows a comparison between the Kalman-based Carrier Phase Estimation algorithm (curve C3) disclosed herein and a more simple algorithm (curve C4) using a moving average applied to the measured phase noise on the pilots (without applying a Kalman filter to the phase of the pilot) and then a linear interpolation for the QKD symbols. As the received symbol is $y_k = e^{j\phi_k}x_k + w_k$ and $x_k$ is known as it is a pilot: the measured phase noise may be determined as $\arg(y_k/x_k)$. The comparison is performed in term of excess noise SKR and modulation variance $V_A$. The use of Kalman filter enables the extraction of SKR for $V_A$ values lower than 6 SNU while no key can be extracted with the simple algorithm without Kalman filter.

Figure 6:
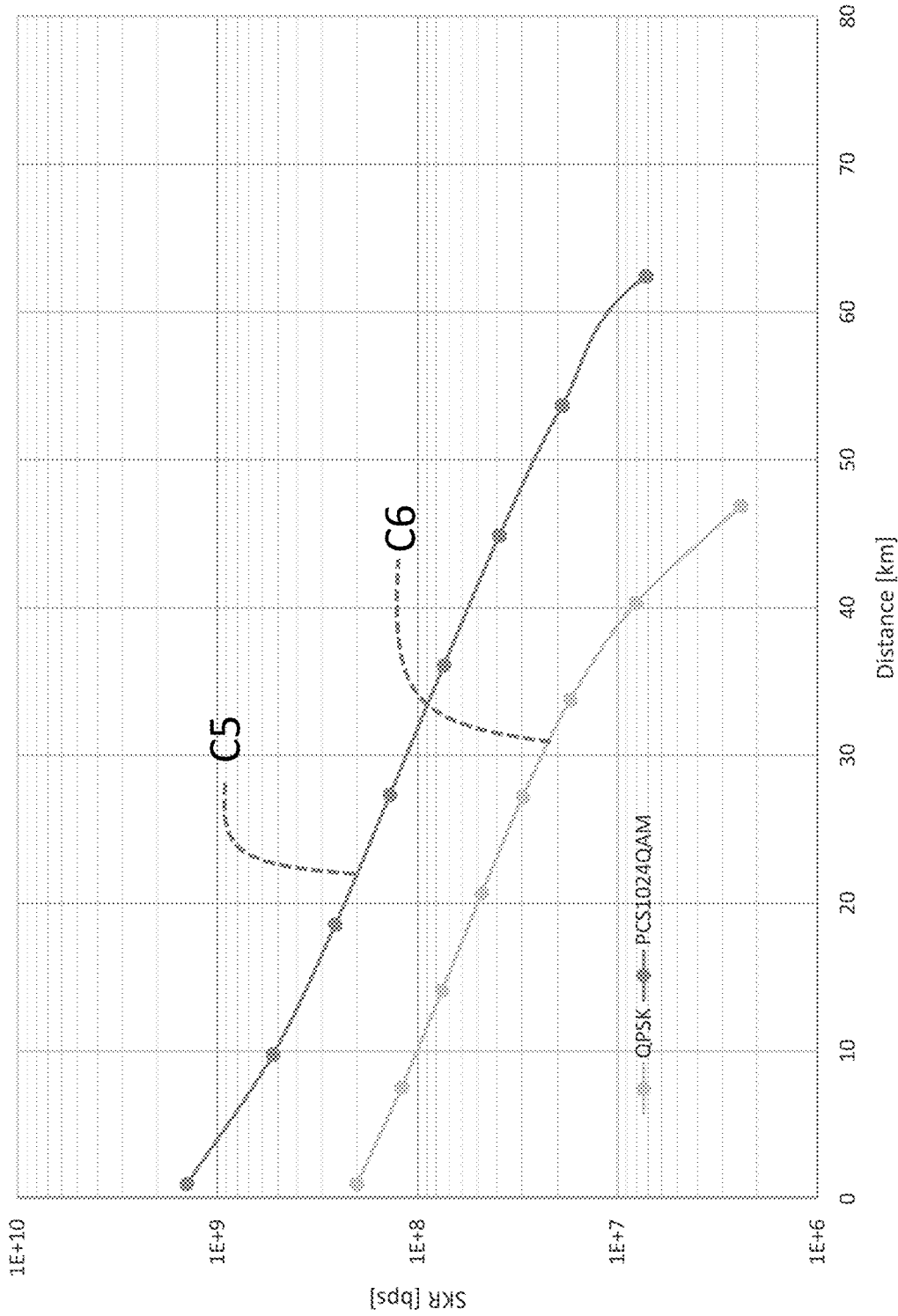
FIG. 6 illustrates performance of a QKD system according to one or more examples.

FIG. 6 shows a comparison between the performance of a QPSK modulation (curve C6) in replacement of a PCS 1024 QAM as described herein and PCS 1024 QAM modulation (curve C5) in terms of SKR and link distance (optical fiber length) for optimal parameters. For the QPSK we used the QPSK security proof (see document by Anthony Leverrier, Philippe Grangier, entitled "Continuous-variable quantum-key-distribution protocols with a non-Gaussian modulation", Physical Review A, American Physical Society, 2011, 83 (4), pp.042312.10.1103). For the PCS 1024 QAM we used the gaussian security proof as disclosed by F. Laudenbach et al., 'Continuous-Variable Quantum Key Distribution with Gaussian Modulation—The Theory of Practical Implementations', Adv. Quantum Technol., vol. 1, no. 1, p. 1800011, August 2018, doi: 10.1002/qute.201800011. The PCS 1024 QAM modulation clearly outperforms the QPSK modulation both in achievable distance and key length in addition to providing more robust security proof.

It should be appreciated by those skilled in the art that any functions, engines, block diagrams, flow diagrams, state transition diagrams and/or flowcharts herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processing apparatus, whether or not such computer or processor is explicitly shown.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

Although a flow chart may describe operations as a sequential process, many of the operations may be performed in parallel, concurrently or simultaneously. In addition, the order of the operations may be re-arranged or may sometimes be executed in the reverse order, depending upon the operations involved. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Each described computation function, block, step can be implemented in hardware, software, firmware, middleware, microcode, or any suitable combination thereof. If implemented in software, the computation functions, blocks of the block diagrams and/or flowchart illustrations can be implemented by computer program instructions/software code, which may be stored or transmitted over a computer-readable medium, or loaded onto a general purpose computer, special purpose computer or other programmable processing apparatus and/or system to produce a machine, such that the computer program instructions or software code which execute on the computer or other programmable processing apparatus, create the means for implementing the functions described herein.

When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause an apparatus to perform the necessary tasks. Additionally, the processor, memory and example algorithms, encoded as computer program code, serve as means for providing or causing performance of operations discussed herein.

In the present description, block denoted as "means configured to perform . . . " (a certain function) shall be understood as functional blocks comprising circuitry that is adapted for performing or configured to perform a certain function. A means being configured to perform a certain function does, hence, not imply that such means necessarily is performing said function (at a given time instant). Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

As used in this application, the term "circuit" or "circuitry" may refer to one or more or all of the following:
 (a) hardware-only circuit implementations (such as implementations in only analog and/or digital circuitry) and
 (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and
 (c) hardware circuit(s) and or processor(s), such as a microprocessor(s) or a portion of a microprocessor(s), that requires software (e.g., firmware) for operation, but the software may not be present when it is not needed for operation."

This definition of "circuit" or "circuitry" applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, an integrated circuit for a network element or network node or any other computing device or network device. The term circuitry may cover digital signal processor (DSP) hardware, network processor, application specific integrated circuit (ASIC), field programmable gate array (FPGA), etc.

The "circuit" or "circuitry" may be or include, for example, hardware, programmable logic, a programmable processor that executes software or firmware, and/or any combination thereof (e.g. a processor, control unit/entity, controller) to execute instructions or software and control transmission and receptions of signals, and a memory to store data and/or instructions.

The "circuit" or "circuitry" may also make decisions or determinations, generate frames, packets or messages for transmission, decode received frames or messages for further processing, and other tasks or functions described herein. The circuitry may control transmission of signals or messages over a radio network, and may control the reception of signals or messages, etc., via a radio network (e.g., after being down-converted by radio transceiver, for example).

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

While aspects of the present disclosure have been particularly shown and described with reference to the embodiments above, it will be understood by those skilled in the art that various additional embodiments may be contemplated by the modification of the disclosed machines, systems and methods without departing from the scope of what is disclosed. Such embodiments should be understood to fall within the scope of the present disclosure as determined based upon the claims and any equivalents thereof.

LIST OF ABBREVIATIONS

CVQKD Continuous Variable Quantum Key Distribution
DVQKD Discrete Variable Quantum Key Distribution
DSP Digital Signal Processing
QPSK Quadrature Phase Shift Keying
SKR Secret (or Secure) Key Rate
Mbps Megabits per second
SNU Shot Noise Unit
CMA Constant Modulus Algorithm
QAM Quadrature Amplitude Modulation
PCS Probabilistic Constellation Shaping
DD-LMS Direct Detection Least Mean Square
CPE Carrier Phase Estimation

The invention claimed is:

1. An apparatus comprising at least one processor and at least one memory storing instructions that, when executed by the at least one processor, cause the apparatus to perform at least the following:
    performing encoding of a random key, comprising:
        generating a coherent source optical signal;
        generating random bits (Ri) of the random key;
        mapping the random bits to generate quadratures values that follow a modulation map, wherein the modulation map is based on a quadrature amplitude modulation, QAM, format that has been adjusted by Probabilistic Constellation Shaping, PCS, to change probability of occurrence of individual constellation points in the QAM format and defines a mapping function for the random bits of the random key; and
        modulating, using the quadratures values, the coherent source optical signal to generate quantum key distribution, QKD, symbols representing the random bits as part of a modulated optical signal, the modulated optical signal including Quadrature Phase Shift Keying, QPSK, pilot symbols temporally multiplexed with the quantum key distribution; and
    outputting the modulated optical signal on an optical channel.

2. The apparatus according to claim 1, wherein the at least one memory further stores instructions that, when executed by the at least one processor, cause the apparatus to perform at least the following: adjust variance of power of the modulated optical signal so that a variance of the QKD symbols after amplification is set to a given value.

3. The apparatus according to claim 1, wherein a frequency of occurrence of symbols in an output block of the quadratures values as per the modulation map correspond to a probability given by a target probability distribution.

4. The apparatus according to claim 3, wherein the target probability distribution is defined by a Maxwell-Boltzmann function.

5. An apparatus comprising at least one processor and at least one memory storing instructions that, when executed by the at least one processor, cause the apparatus to perform at least the following:
    performing decoding of a random key, comprising:
        receiving and extracting-input symbols from an optical channel having a modulated optical signal, wherein the input symbols include Quadrature Phase Shift Keying, QPSK, pilot symbols temporally multiplexed with quantum key distribution, QKD, symbols representing random bits of a random key, wherein quadratures values of the modulated optical signal follow a modulation map, wherein the modulation map is based on a quadrature amplitude modulation, QAM, format that has been adjusted by Probabilistic Constellation Shaping, PCS, to change probability of occurrence of individual constellation points in the QAM format and defines a mapping function for the random bits of the random key;
        applying a polarization correction to the input symbols to generate first corrected QKD symbols and corrected pilot symbols, wherein the polarization correction is determined based at least on the pilot symbols; and
        applying a carrier phase correction to the first corrected QKD symbols to generate second corrected QKD symbols representing an estimate of said random key, wherein the carrier phase correction is determined based on the corrected pilot symbols; and
    outputting the second corrected QKD symbols.

6. The apparatus according to claim 5, wherein applying the polarization correction includes determining a rotation matrix in a Stokes space representing a polarization impairment, determining an inverse matrix of a Jones matrix associated to the rotation matrix and applying in a Jones space the inverse matrix to vectors representing the input symbols.

7. The apparatus according to claim 6, wherein determining the rotation matrix includes at least the following:
converting input symbols into corresponding vectors in the Stokes space;
performing a linear regression on the vectors in the Stokes space to obtain a regression vector; and
determining the rotation matrix in the Stokes space from the regression vector.

8. The apparatus according to claim 6, wherein determining the inverse matrix includes
converting the rotation matrix in the Stokes space to a Jones matrix in the Jones space; and
inversing the Jones matrix in the Jones space to obtain the inverse matrix.

9. The apparatus according to claim 5, wherein applying the carrier phase correction includes applying a Kalman filter to the corrected pilot symbols obtained from corresponding pilot symbols to estimate phase noise values for the corresponding pilot symbols and estimating a phase noise value for a QKD symbol by applying a linear interpolation to phase noise values estimated for at least a first pilot symbol and at least one second pilot symbol between which the QKD symbol is temporally interleaved.

10. The apparatus according to claim 5, wherein a frequency of occurrence of symbols in an output block of the quadratures values as per the modulation map correspond to a probability given by a target probability distribution.

11. The apparatus according to claim 10, wherein the target probability distribution is defined by a Maxwell-Boltzmann function.

12. A method, the method comprising:
performing decoding of a random key, comprising:
obtaining input symbols from an optical channel having a modulated optical signal, wherein the input symbols include Quadrature Phase Shift Keying, QPSK, pilot symbols temporally multiplexed with quantum key distribution, QKD, symbols representing random bits of the random key, wherein quadratures values of the modulated optical signal follow a modulation map, wherein the modulation map is based on a quadrature amplitude modulation, QAM, format that has been adjusted by Probabilistic Constellation Shaping, PCS, to change probability of occurrence of individual constellation points in the QAM format and defines a mapping function for the random bits of the random key;
applying a polarization correction to the input symbols to generate first corrected QKD symbols and corrected pilot symbols, wherein the polarization correction is determined based at least on the pilot symbols; and
applying a carrier phase correction to the first corrected QKD symbols to generate second corrected QKD symbols representing an estimate of said random key, wherein the carrier phase correction is determined based on the corrected pilot symbols; and
outputting the second corrected QKD symbols.

13. The method according to claim 12, wherein applying the polarization correction includes determining a rotation matrix in a Stokes space representing a polarization impairment based at least on the pilot symbols, determining an inverse matrix of a Jones matrix associated to the rotation matrix and applying in a Jones space the inverse matrix to vectors representing the QKD symbols.

14. The method according to claim 13, wherein determining the rotation matrix includes at least the following:
converting input symbols into corresponding vectors in the Stokes space;
performing a linear regression on the vectors in the Stokes space to obtain a regression vector; and
determining a rotation matrix in the Stokes space from the regression vector.

15. The method according to claim 13, wherein determining the inverse matrix includes
converting the rotation matrix to a Jones matrix in the Jones space; and
inversing the Jones matrix in the Jones space to obtain the inverse matrix.

16. The method according to claim 12, wherein applying the carrier phase correction includes applying a Kalman filter to the corrected pilot symbols obtained from corresponding pilot symbols to estimate respective phase noise values for the corresponding pilot symbols and estimating a phase noise value for a QKD symbol by applying a linear interpolation to phase noise values estimated for at least a first pilot symbol and at least one second pilot symbol between which the QKD symbol is temporally interleaved.

* * * * *